United States Patent
Florit et al.

(10) Patent No.: US 8,385,215 B1
(45) Date of Patent: Feb. 26, 2013

(54) SYSTEM AND METHOD FOR PROVIDING TESTING IN AN ETHERNET NETWORK ENVIRONMENT

(75) Inventors: Lionel Florit, Greenbrae, CA (US); Jose A. Liste, Sunnyvale, CA (US); Samer M. Salam, Vancouver (CA)

(73) Assignee: Cisco Technoogy, Inc., San Jose, CA (US)

( * ) Notice: Subject to any disclaimer, the term of this patent is extended or adjusted under 35 U.S.C. 154(b) by 545 days.

(21) Appl. No.: 12/270,563

(22) Filed: Nov. 13, 2008

(51) Int. Cl.
*G01R 31/08* (2006.01)
*G06F 11/00* (2006.01)

(52) U.S. Cl. ...................................................... 370/248

(58) Field of Classification Search .................. 370/248, 370/249
See application file for complete search history.

(56) References Cited

U.S. PATENT DOCUMENTS

| | | | |
|---|---|---|---|
| 7,028,092 B2 | 4/2006 | MeLampy et al. | |
| 7,031,311 B2 | 4/2006 | MeLampy et al. | |
| 7,072,303 B2 | 7/2006 | MeLampy et al. | |
| 7,103,008 B2 | 9/2006 | Greenblat et al. | |
| 7,133,923 B2 | 11/2006 | MeLampy et al. | |
| 7,362,707 B2 | 4/2008 | MeLampy et al. | |
| 7,512,141 B2 * | 3/2009 | Elie-Dit-Cosaque et al. | 370/408 |
| 7,710,888 B2 * | 5/2010 | DelRegno et al. | 370/249 |
| 2006/0013217 A1 * | 1/2006 | Datla et al. | 370/389 |
| 2006/0047851 A1 * | 3/2006 | Voit et al. | 709/239 |
| 2007/0025256 A1 * | 2/2007 | Hertoghs et al. | 370/236.2 |
| 2008/0052394 A1 | 2/2008 | Bugenhagen et al. | |
| 2008/0151907 A1 | 6/2008 | Ge et al. | |

* cited by examiner

*Primary Examiner* — Mark Rinehart
*Assistant Examiner* — Maharishi Khirodhar
(74) *Attorney, Agent, or Firm* — Patent Capital Group

(57) ABSTRACT

A method is provided in one example embodiment and includes generating a test port in a network environment, positioning the test port on a network element, associating the test port with a bridge domain, and configuring a maintenance point (MP) on the test port. The method further includes using the MP on the test port for connectivity fault management (CFM) operations at a test level.

14 Claims, 5 Drawing Sheets

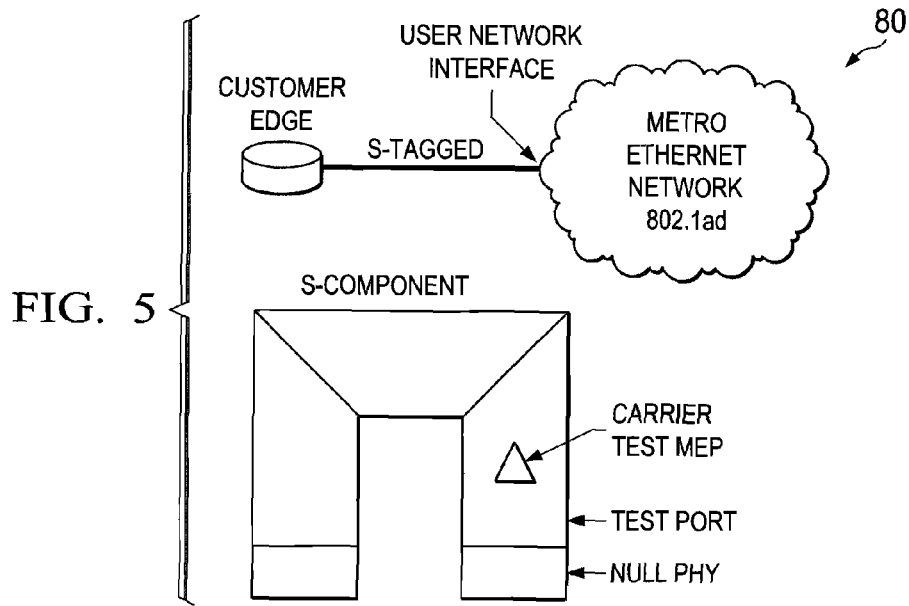
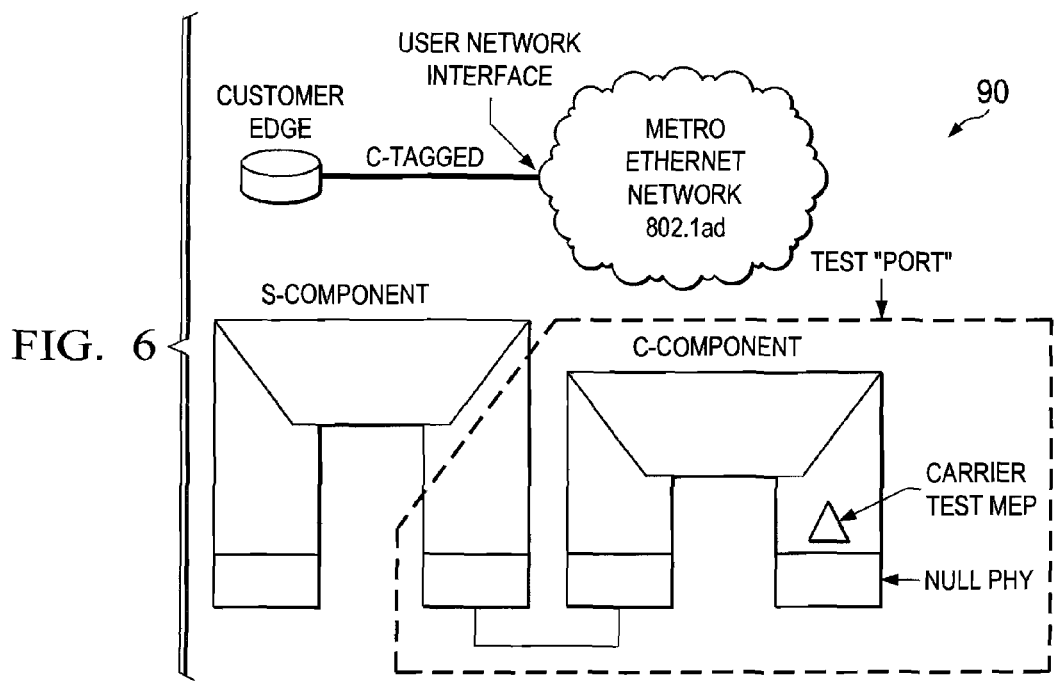

SYSTEM AND METHOD FOR PROVIDING TESTING IN AN ETHERNET NETWORK ENVIRONMENT

TECHNICAL FIELD OF THE INVENTION

This invention relates in general to the field of communications and, more particularly, to a system and a method for providing testing in an Ethernet network environment.

BACKGROUND OF THE INVENTION

Networking architectures have grown increasingly complex in communication environments. This complexity has resulted in numerous protocols being implemented to ensure that network elements are functional and, further, delivering packets in an efficient manner. For example, certain carrier Ethernet Service Providers have expressed interest in having the capability to test connectivity to customer edge (CE) devices using Ethernet technology, without impacting the customer's self-use of Ethernet connectivity fault management (CFM).

This effectively would allow the Service Provider to view the service status as the customer experiences it. There is a current movement to standardize these activities in the Metro Ethernet Forum. This emerging standard defines a Customer Level operations, administration, and maintenance (OAM) domain to be used by a test maintenance entity group (MEG). It may require CE devices to implement a test maintenance end point (MEP) (or any other type of maintenance point) that has certain functions disabled by default. The standard leaves it up to the Service Provider to determine where to place the Carrier Test MEP within the network and, further, stops at addressing several significant options.

Thus, the ability to offer a system or a protocol that provides an effective testing mechanism (without hindering system speeds, creating additional unnecessary overhead, or taxing processing capabilities of network components) provides a significant challenge to network designers, component manufacturers, service providers, and system administrators alike.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIGS. 5-8 are simplified block diagrams of example S-Tagged and C-Tagged architectures.

DETAILED DESCRIPTION OF EXAMPLE EMBODIMENTS

Overview

A method is provided in one example embodiment and includes generating a test port in a network environment, positioning the test port on a network element, associating the test port with a bridge domain, and configuring a maintenance point (MP) on the test port. The method further includes using the MP on the test port for connectivity fault management (CFM) operations at a test level. In more specific terms and embodiments, the MP can be used on the test port for CFM operations at the test level for both performance and fault-management diagnostics. In addition, the test port is dynamically created on a service provider bridge and is used to host the MP, which is a Carrier Test MP. The CFM element can be used to test connectivity to one or more customer edge devices from a bridge within the network environment that transports that customer's data frames. [More specifically, it is a bridge that is involved in passing data-frames for the said customer. Stated in different terms, the bridge should be on the customer service path.] Note that the Test Port is configured as a member of the Bridge Domain corresponding to the Ethernet Virtual Connection (EVC) being tested, as is further detailed below.

Figure 1:
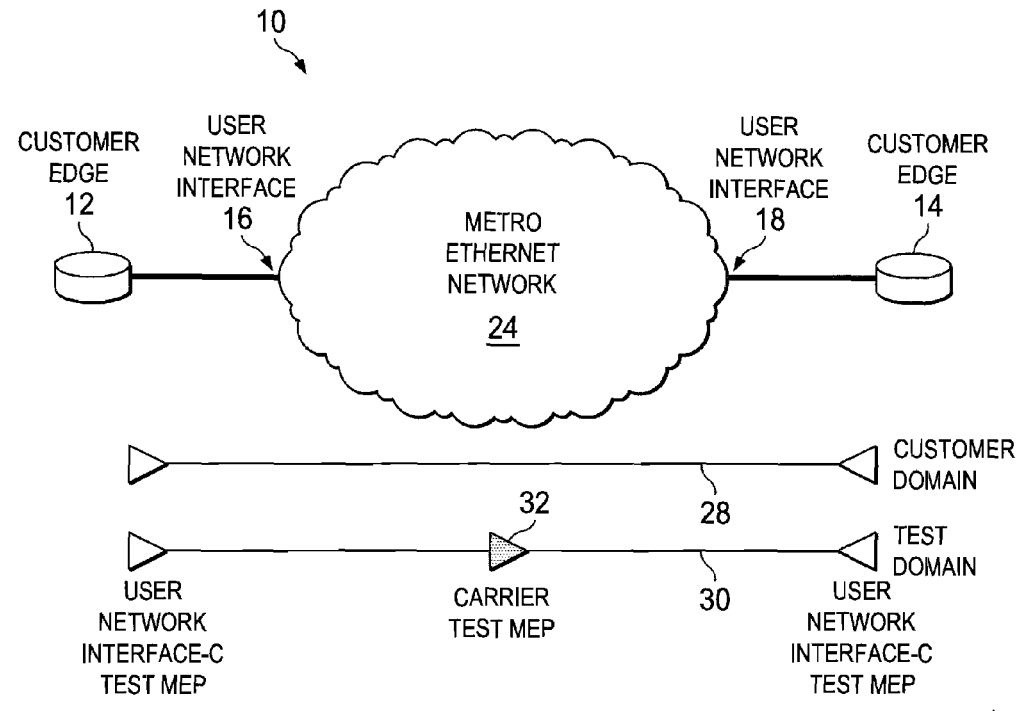
FIG. 1 is a simplified block diagram of a communication system for offering a testing environment in accordance with one embodiment of the present invention.

Turning to FIG. 1, FIG. 1 is a simplified block diagram of a communication system 10 for offering a testing environment in accordance with one embodiment of the present invention. Communication system 10 may include multiple customer edges 12 and 14, which are network elements such as routers: each of which may be coupled to a user network interface (UNI) 16 and 18, which are coupled to a Metro Ethernet Network 24. Also illustrated in FIG. 1 are a customer domain 28 and a test domain 30, which includes a Carrier Test maintenance end point (MEP) 32.

It is imperative to note that although some of the descriptions tendered here identify an MEP (or a maintenance intermediate point (MIP)), or the potential direction of these elements, this has only been done for purposes of explanation and teaching, as virtually any maintenance point, element, object, or component could benefit from the teachings of the present invention. Any such acceptable alternative is included within the province of the term 'maintenance point' as used in the Specification.

Additionally, as used herein in this Specification, the term 'network element' is meant to encompass routers, switches, gateways, bridges, loadbalancers, firewalls, or any other suitable device, component, element, or object operable to exchange information in a network environment. Moreover, these elements may include any suitable hardware, software, components, modules, interfaces, or objects that facilitate the operations thereof. This may be inclusive of appropriate algorithms and communication protocols that allow for the effective exchange of data or information.

FIG. 1 may be generally configured or arranged to represent any communication architecture capable of exchanging packets in a network environment. The Metro Ethernet Network arrangement is just one of the many possible architectures that could adopt the innovative concepts as outlined herein. Such configurations may include, for example, first generation, 2G, 2.5G, and 3G mobile architectures that offer packet-exchanging capabilities. In addition, communication system 10 may include any suitable networking protocol or arrangement that provides a communicative platform for communication system 10. Thus, communication system 10 may include a configuration capable of transmission control protocol/internet protocol (TCP/IP) communications for the transmission or reception of packets in a network. Communication system 10 may also operate in conjunction with a user datagram protocol/IP (UDP/IP) or any other suitable protocol where appropriate and based on particular needs.

As noted earlier, carrier Ethernet Service Providers have sought to test connectivity to the CE devices shown in FIG. 1. This can be accomplished by using Ethernet Connectivity Fault Management (CFM) [i.e., IEEE 802.1ag/ITU-T Y.1731] without impacting the customer's self-use of CFM. This allows the Service Provider (SP) to view the service status from the customer's vantage (i.e., peer from the perspective of the Customer Level CFM domain).

This requirement is being standardized in the Metro Ethernet Forum. This emerging standard defines a Customer Level Operations, Administration, and Management (OAM) domain to be used by the test maintenance entity group (MEG). It requires CE devices to implement a Test MEP (UNI-C Test MEP) that has certain functions disabled by default. The standard leaves it up to the SP to determine where to place the Carrier Test MEP within the network, but stops at providing the following options: 1) Carrier Test MEP may be temporary or permanent; and 2) Carrier Test MEP may utilize an existing UNI-C to perform these tests (i.e., Carrier Test MEP is placed on the CE device and coincides with a UNI-C Test MEP), or the Carrier Test MEP may be placed at another location within the SP network.

Before delving further into the architecture, two points are worth noting. First, placing the carrier Test MEP on the CE is not a viable option in case of non-managed services because the SP does not have access to the CE device. Furthermore, even for managed services, this option may not be cost-effective because it may involve a truck roll. For these reasons, SPs are interested in having the test MEP be placed somewhere else in the network (other than the CE). Second, if the SP wishes to place the Carrier Test MEP on some device within their network (other than the CE), then they should be careful in this placement because a Carrier Test MEP, when placed improperly, would lead to unintended consequences such as blocking other CFM domains in the network (Operator and SP Level Domains), or such misplacements could lead to leaking service frames.

In accordance with the techniques and teachings of the present invention, communication system 10 provides a solution to the problem of Carrier Test MEP placement that is superior to other systems in terms of cost, flexibility, and operational simplicity. Essentially, communication system 10 introduces a virtual port (Test Port) that can be created on-demand in a bridge for hosting the Carrier Test MEP. The Test Port is configured as a member of the Bridge Domain corresponding to the EVC being tested. Note that the term 'Port' is being used in a broad way (as discussed herein), as the actual IEEE model mapping of the Test Port can be more complex than what is being explained here (e.g., in some cases it is more than just a single Bridge "Port").

A helpful analogy to this concept might be the notion of 'loopback interfaces' supported in many routers today, except that loopback interfaces (typically) only apply to Layer-3 routing, whereas the Test Port tendered here is connected to a Layer-2 bridging function instead of a Layer-3 routing forwarder.

The actual Test Port can have some of the following characteristics. First, the test Port has a null PHY function; hence, no service (user data) frames should be transmitted/received over the port. Second, the down MEP and maintenance intermediate point (MIP) functions are not necessarily supported: only up MEPs are supported. Third, the Test Port can be transparent to bridge control protocol operations with the exception of CFM (e.g., does not impact normal operation of a spanning tree protocol (STP) in the network). Fourth, the Test Port can be created and removed on the fly, based on operator action (command line interface (CLI), management information base (MIB), etc.) and can be associated with the Bridge Domain of a given EVC without any impact on normal traffic forwarding for the EVC. Stated otherwise, it is transparent to the service operation.

Figure 2:
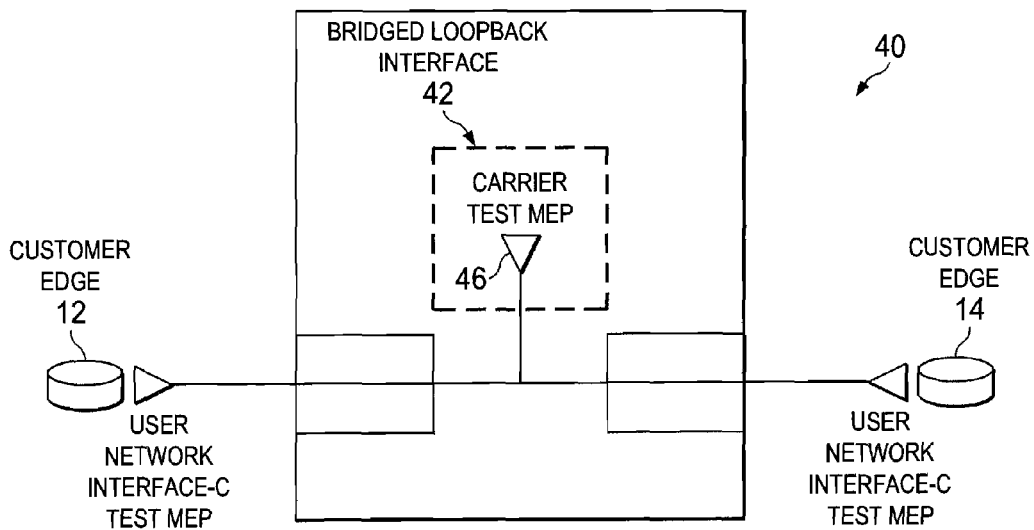
FIG. 2 is a simplified block diagram of a testing model associated with the communication system.
Figure 3:
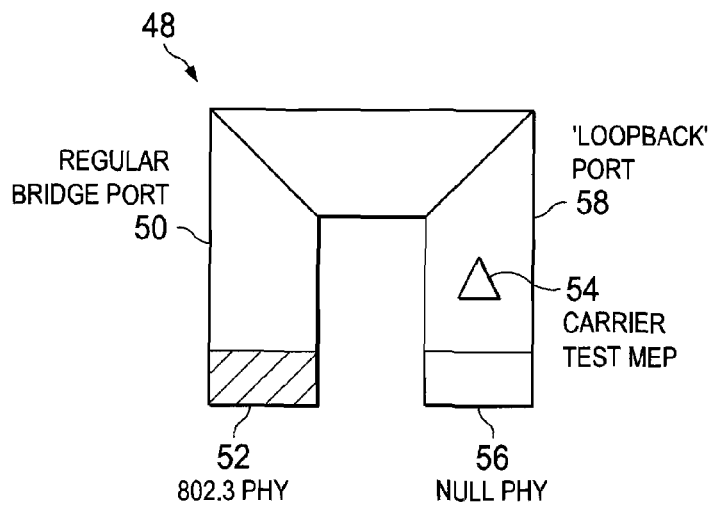
FIG. 3 is a simplified block diagram of an example component of the communication system.

Turning now to the example of FIG. 2, FIG. 2 is a simplified block diagram of a Carrier Test model associated with communication system 10. FIG. 2 includes customer edge nodes 12 and 14, which are coupled to a provider bridge/switch 40 on which a Test Port component (which includes a Carrier Test MEP 46 and a bridged loopback interface 42) is instantiated. Because they are being described together, it is relevant to also introduce FIG. 3, which is a simplified block diagram of an example S-component 48 of a provider bridge in communication system 10. FIG. 3 includes a regular bridge port 50 with 802.3 PHY 52, a Carrier Test MEP 54 (shown as a triangle), and a loopback port 58 with null PHY 56.

In operation of an example flow, the thought is to create a loopback interface. In this example, this could be labeled loopback0. Then, associate loopback0 with the desired Bridge Domain. Next, configure the up MEP on loopback0. The MEP can be used for all CFM operations at the Test Level. No data traffic passes through the loopback interface.

In terms of the bridge model of FIG. 3, it may be clearer to explain the "Test Port" construction and how it should be implemented using the IEEE bridge model as a reference. Two scenarios need to be distinguished, depending on the type of service user network interface (UNI) that the SP is offering to its customer for the EVC under test. For the S-Tagged UNI, this represents a simpler scenario. The CE sends the provider edge (PE) S-Tagged frames. The UNI-C Test MEP operates on the Service virtual local area network (S-VLAN) for the EVC. Thus, the Carrier Test MEP could run on the S-VLAN Identifier (S-VID) used in the provider's network for the EVC in question. The Test Port is then modeled as a (virtual) S-Component Customer Network Port with a null PHY function. FIGS. 2 and 3 collectively depict such an architecture.

In terms of advantages in such a configuration, this solution allows the SP to create a 'tap' to diagnose the service from the perspective of the customer. Further, this solution allows the SP to place a Test MEP on any device within their network that is on the path of the customer's EVC, without worrying about physical port availability or the possibility of leaking service frames.

Figure 4:
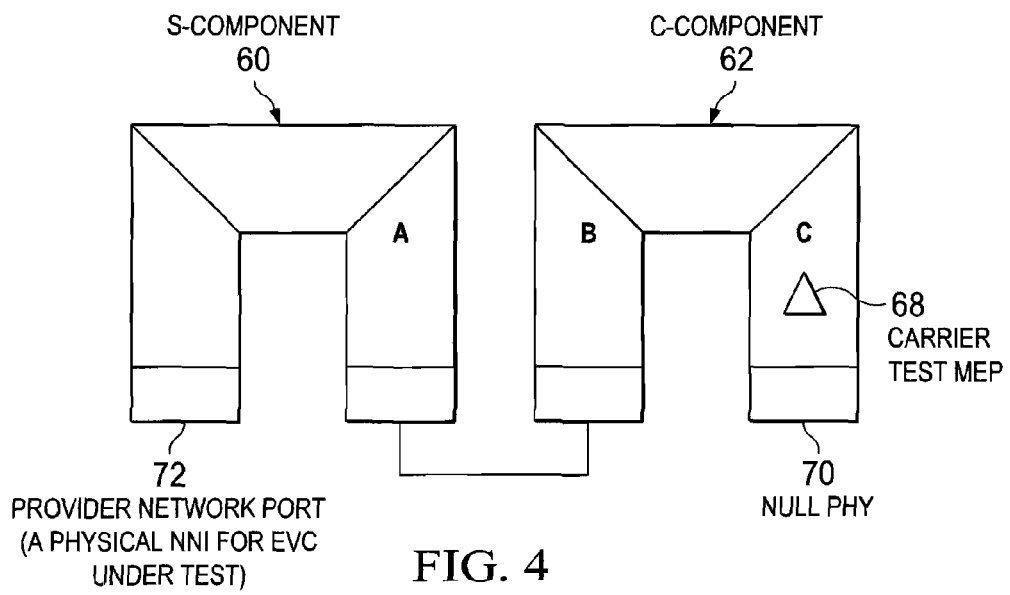
FIG. 4 is a simplified block diagram of virtual components in the test model.

FIG. 4 is a simplified block diagram of components in the test model in the scenario of a C-Tagged UNI. FIG. 4 includes an S-Component 60 (which includes a provider network port 72, which is a physical network-to-network interface (NNI) for the EVC under test) and a virtual C-Component 62, which includes a Carrier Test MEP 68 and a null PHY 70. In this scenario, the CE sends C-Tagged frames to the PE. The PE applies an S-VLAN tag to the service frames before forwarding them within the provider's network. The UNI-C Test MEP operates on a C-VLAN for the EVC under test. In order for the Carrier Test MEP to be able to perform diagnostics and test reachability to the UNI-C Test MEP, the former should send/receive double-tagged CFM frames. The S-VLAN should correspond to the S-VID used by the SP for the EVC under test.

The C-VLAN corresponds to the C-VID used by the UNI-C Test MEP. In this scenario, the Test "Port" is actually more than a bridge port. It can comprise a virtual C-Component plus a virtual Customer Network Port on an S-Component. FIG. 4 depicts such a model. The "Test Port" here can include the following building blocks:

1. A virtual Customer Network Port on an S-Component ('A' in FIG. 4, which is coupled to 'B'). Thus, this port connects to a virtual C-Component.

2. A virtual C-Component with a Customer Edge Port that has a null PHY function ('C' in FIG. 4).

The Carrier Test MEP is an up MEP on the Customer Edge Port of the C-Component. It should be noted that what is being described is an example enablement, where the SP is employing Provider Bridge (i.e. IEEE 802.1ad) technology. However, it is possible to extrapolate the concepts mentioned here to apply to Provider Backbone Bridging (IEEE 802.1ah) or other technologies. The model would have to be extended, accordingly, to incorporate the relevant I-Components and/or B-Components. The service provider bridge could readily be an 802.1Q, an 802.1ad, or an 802.1ah bridge, or any other suitable bridge, based on particular needs.

In regards to the actual network operations, the Network Administrator would select a device on which to place the Carrier Test MEP. This may be any network element (e.g., a bridge) in the provider's network that forwards service frames for the associated EVC, irrespective of configured CFM domains. The administrator creates the Test Port and associates it with the desired Bridge Domain (corresponding to the EVC under test). The implementation takes care of creating all the necessary constructs (either virtual port or virtual C-component, etc.). Then, the administrator configures the up MEP on the Test Port and uses that for CFM operations at the Test Level: including both performance and fault-management diagnostics.

In summary, the aforementioned configurations offer the virtual bridge port (or C-Component plus bridge port) that can be dynamically created on any Bridge and, further, be used to host the Carrier Test MEP. This allows the SP to use CFM to test connectivity to the CE devices from any bridge within the SP network that is on the path of the customer's EVC. This is achieved with maximum flexibility and without adverse side effects. In terms of advantages, this approach works for both managed and non-managed services, and does not require a truck roll arrangement. Additionally, this does not necessarily require the addition of new hardware to achieve the described operations, as a simple software upgrade could be used.

Moreover, such an improvement allows diagnostics from a single Carrier Test MEP to all the UNI-C Test MEPs of a given EVC. In addition, such a protocol does not affect the operation of other CFM domains in the network in any way. [Example: SP and Operator level domain operation continues transparently]. The proposed solution also gives the SP the flexibility of choosing any bridge (that forwards EVC under test service frames) to host the Carrier Test MEP, independent of availability of free physical interfaces.

In one example implementation, the Carrier Test MEP includes software to achieve the optimal testing operations, as outlined herein in this document. In other embodiments, this feature may be provided external to the Carrier Test MEP or included in some other network device to achieve this intended functionality. Alternatively, both the Carrier Test MEP and/or the associated endpoint or network element include this software (or reciprocating software) that can coordinate in order to achieve the testing operations outlined herein. In still other embodiments, one or each of these devices may include any suitable algorithms, hardware, software, components, modules, interfaces, or objects that facilitate the operations thereof. This may be inclusive of appropriate communication protocols that allow for the effective exchange of data or information for achieving testing in a network environment.

Each of these elements (Carrier Test MEP, network element, endpoint, etc.) can also include memory elements for storing information to be used in achieving the testing operations outlined herein. Additionally, each of these devices may include a processor that can execute software or an algorithm to perform the testing activities, as discussed in this Specification. These devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

Turning now to FIGS. 5-6, depicted are simplified block diagrams of example S-Tagged and C-Tagged architectures respectively. In a general sense, these are Bridge Models: specifically a Provider Bridged Network (PBN), where S-Tagged UNIs vs. C-Tagged UNIs are being illustrated.

In FIG. 5, there is an S-Tagged UNI 80 illustration. For the S-Tagged UNI, Carrier Test MEP runs on S-VLAN used within a Metropolitan Ethernet Network (MEN). In regards to FIG. 6, illustrated is a C-Tagged UNI 90. For a C-Tagged UNI, the Carrier Test MEP runs on double-tags: (S-VLAN, C-VLAN). Coordination may be required between the service provider and the Customer on C-VLAN to be used.

Figure 7:
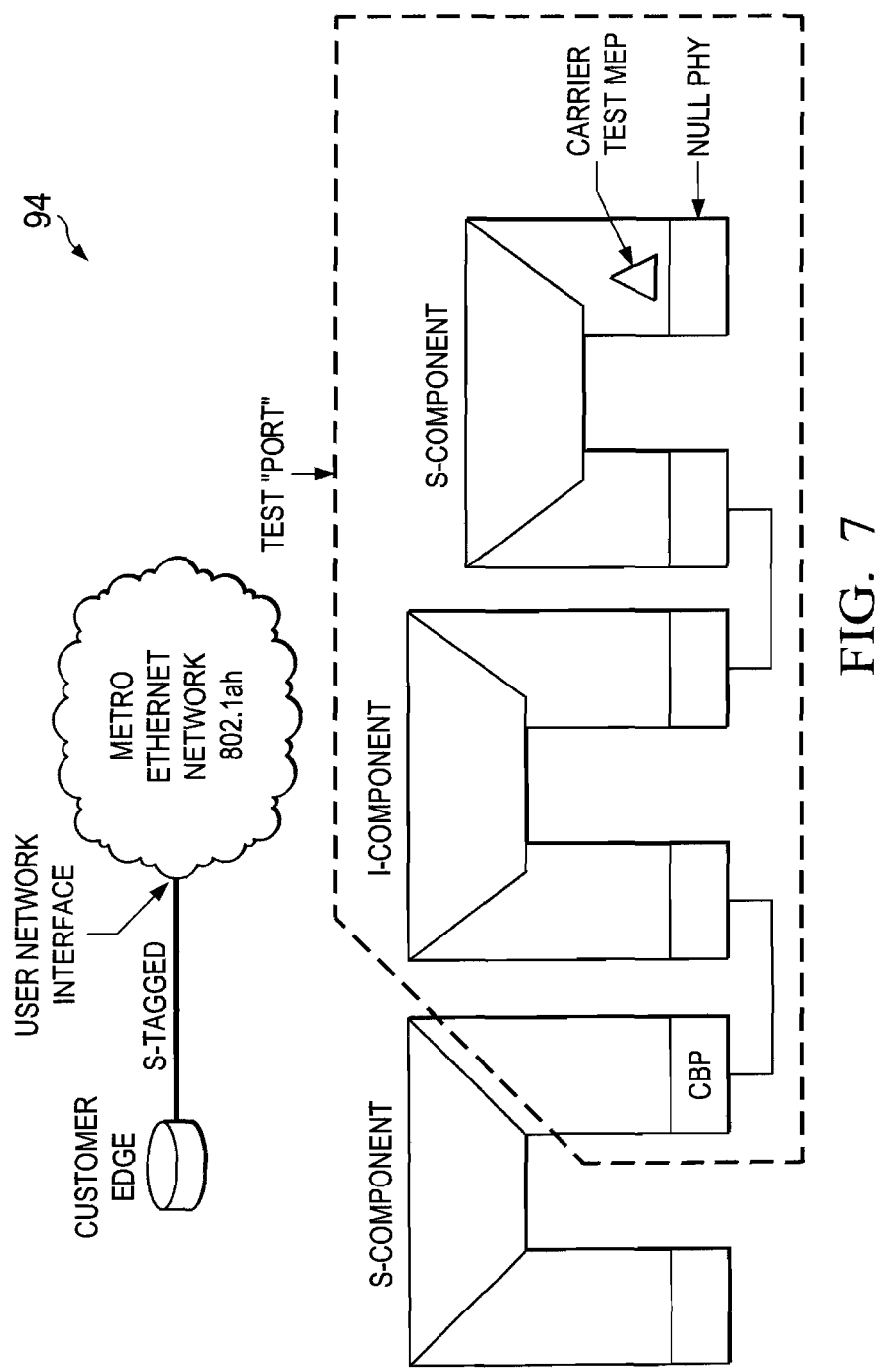
Figure 8:
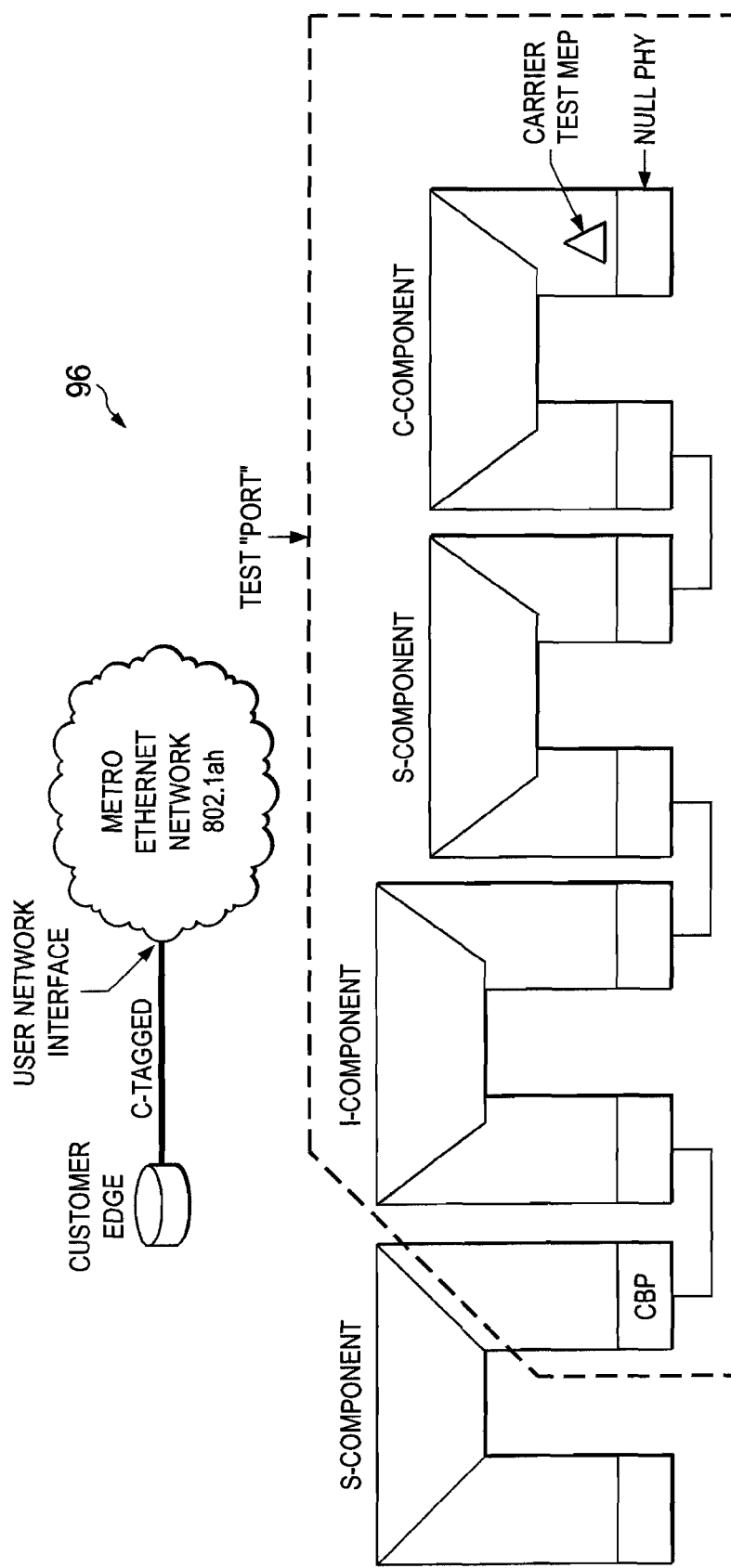

Turning to FIGS. 7-8, depicted are simplified block diagrams of example S-Tagged and C-Tagged architectures respectively. In this case, these represent a Provider Backbone Bridge Network (PBBN), where S-Tagged UNIs vs. C-Tagged UNIs are being illustrated.

In FIG. 7, there is an S-Tagged UNI 94 illustration. In this scenario, the Carrier Test MEP runs on a virtual S-Component connected to virtual I-Component. This, in turn, is connected to a virtual customer backbone port (CBP) on the S-Component of the service provider's backbone core bridge (BCB). Coordination may be important between the service provider and the customer for the S-VLAN to be used.

In regards to FIG. 8, illustrated is a C-Tagged UNI 96. In this instance, the Carrier Test MEP runs on a virtual C-Component connected to a virtual S-Component. This is connected to virtual I-Component, which in turn is connected to a virtual CBP on the S-Component of the service provider's BCB. Again, coordination amongst the service provider and the customer may be important for the S-VLAN, C-VLAN to be used.

In terms of security considerations, for the service provider, ideally, the Carrier Test MEP should use the Test Bridge Port MAC address instead of the Bridge Brain MAC address. This serves to hide the Bridge Brain MAC address from the customer. When the Test MEP is removed, the Test Port MAC is no longer listened to, which insulates the system from a possible denial of service (DOS) attack. For the enterprise customer, in terms of security, the Test MEP on the UNI-C cannot be reached unless its MAC address is known (i.e., as long as Y.1731 multicast loopback is not supported on UNI-C).

It is important to note that the steps described with reference to the preceding FIGURES illustrate only some of the possible scenarios that may be executed by, or within, communication system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present invention.

Finally, although the present invention has been described in detail with reference to particular arrangements and configurations, these example configurations and arrangements may be changed significantly without departing from the scope of the present invention. For example, although the present invention has been described with reference to particular communication exchanges involving certain protocols (e.g., Metro Ethernet), communication system 10 may be applicable to other communication platforms, or routing protocols in which testing is sought to be conducted.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
    positioning a test port on a network element;
    associating the test port with a bridge domain, wherein the test port is coupled to a Layer 2 bridging function; and
    configuring a maintenance point (MP) on the test port, wherein the test port can be dynamically generated and removed using a command line interface (CLI), and wherein the network element is a bridge configured to forward service frames for an associated Ethernet Virtual Connection (EVC), wherein the bridge includes a regular bridge port and a loopback interface through which no data traffic passes; and
    using the MP on the test port for connectivity fault management (CFM) operations at a test level, wherein the test port is dynamically created and used to host the MP, which is a Carrier Test MP.

2. The method of claim 1, wherein the MP is used on the test port for CFM operations at the test level for both performance and fault-management diagnostics.

3. The method of claim 1, wherein a CFM element is used to test connectivity to one or more customer edge devices from a bridge within the network environment that has connectivity to the devices.

4. The method of claim 1, wherein the test port is a loopback port configured with a Carrier Test MP.

5. The method of claim 1, wherein the bridge domain corresponds to an EVC under test.

6. An apparatus, comprising:
    a test port coupled to a network element, which operates in a network environment, wherein the test port is associated with a bridge domain, wherein the test port is coupled to a Layer 2 bridging function, and wherein a maintenance point (MP) is configured on the test port, and wherein the MP is used on the test port for connectivity fault management (CFM) operations at a test level, wherein the test port can be dynamically generated and removed using a command line interface (CLI), and wherein the network element is a bridge configured to forward service frames for an associated Ethernet Virtual Connection (EVC), and wherein the bridge includes a regular bridge port and a loopback interface through which no data traffic passes, wherein the test port is dynamically created and used to host the MP, which is a Carrier Test MP.

7. The apparatus of claim 6, wherein the MP is used on the test port for CFM operations at the test level for both performance and fault-management diagnostics.

8. The apparatus of claim 6, wherein a CFM element is used to test connectivity to one or more customer edge devices from a bridge within the network environment that has connectivity to the devices, and wherein the service provider bridge is an 802.1Q, an 802.1ad, or an 802.1ah bridge.

9. The apparatus of claim 6, wherein the test port is a loopback port configured with a Carrier Test MP.

10. One or more non-transitory media having logic for execution and when executed by a processor operable to:
    position a test port on a network element;
    associate the test port with a bridge domain, wherein the test port is coupled to a Layer 2 bridging function; and
    configure a maintenance point (MP) on the test port, wherein the test port can be dynamically generated and removed using a command line interface (CLI), and wherein the network element is a bridge configured to forward service frames for an associated Ethernet Virtual Connection (EVC), wherein the bridge includes a regular bridge port and a loopback interface through which no data traffic passes; and
    use the MP on the test port for connectivity fault management (CFM) operations at a test level, wherein the test port is dynamically created and used to host the MP, which is a Carrier Test MP.

11. The non-transitory media of claim 10, wherein the MP is used on the test port for CFM operations at the test level for both performance and fault-management diagnostics.

12. The non-transitory media of claim 10, wherein a CFM element is used to test connectivity to one or more customer edge devices from a bridge within the network environment.

13. The non-transitory media of claim 10, wherein the test port is a loopback port configured with a Carrier Test MP.

14. A system, comprising:
    means for positioning a test port on a network element;
    means for associating the test port with a bridge domain, wherein the test port is coupled to a Layer 2 bridging function; and
    means for configuring a maintenance point (MP) on the test port, wherein the test port can be dynamically generated and removed using a command line interface (CLI), and wherein the network element is a bridge configured to forward service frames for an associated Ethernet Virtual Connection (EVC), wherein the bridge includes a regular bridge port and a loopback interface through which no data traffic passes; and
    means for using the MP on the test port for connectivity fault management (CFM) operations at a test level, wherein the test port is a loopback port configured with a Carrier Test MP.

* * * * *